Jan. 2, 1962 W. V. TYRLICK 3,015,813

BINARY INFORMATION DECODER

Filed May 2, 1958

INVENTOR.
WILLIAM V. TYRLICK

BY Richard G. Stahr

ATTORNEY

United States Patent Office 3,015,813

Patented Jan. 2, 1962

3,015,813

BINARY INFORMATION DECODER

William V. Tyrlick, Rochester, N.Y., assignor to General Dynamics Corporation, Rochester, N.Y., a corporation of Delaware Filed May 2, 1958, Ser. No. 732,645

3 Claims. (Cl. 340—347)

Figure 1:
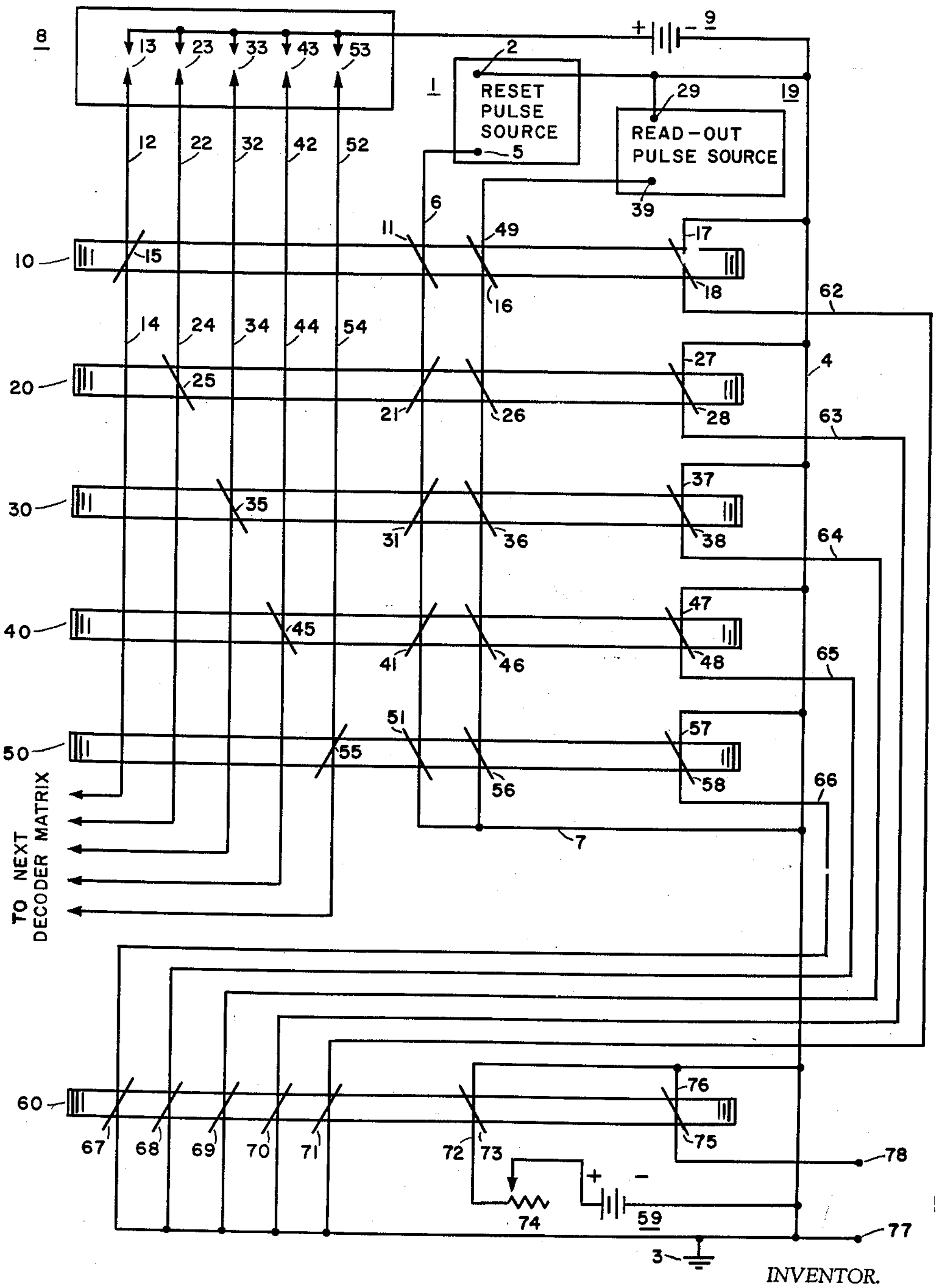

The present invention relates to binary information decoder devices and, more specifically, to a decoder employing only solid-state components.

There are numerous applications, particularly with the use of information which is expressed in binary form, in which it is necessary to monitor a source of binary information and distinguish between the characters. Therefore, in these applications it is important that a device be employed which is responsive to only the preselected character which it is designed to decode and no other.

It is, accordingly, an object of this invention to provide an improved decoder device.

It is another object of this invention to provide a decoder device employing only solid-state components.

In accordance with this invention, a matrix of magnetic members each having two stable conditions of magnetic saturation, corresponding to each information bit of a binary code, and a separate magnetic member also having two stable conditions of magnetic saturation are employed.

To establish the initial operating condition, a reset energizing current pulse is applied to each of the magnetic members in the matrix concurrently in a polarity sense for producing either stable condition of magnetic saturation in those members corresponding to the first polarity information bits and the opposite condition of magnetic saturation in those members corresponding to the other polarity bits of the binary code of the character selected to be decoded thereby. The initial condition of magnetic saturation in the separate member is established by a direct current bias coupled thereto.

Each of the individual output circuits of a monitoring device, having an individual output circuit for each information bit, is individually coupled to its corresponding magnetic member. Signal energizing current pulses which may appear in any or all of the individual output circuits for information bits of a first polarity only are thereby applied to the corresponding magnetic member in a polarity sense opposite that of the reset energizing current pulse applied to the same member.

A readout energizing current pulse is then applied, through a coupling circuit, simultaneously to all of the members in the matrix in a polarity sense for producing the stable condition of saturation in all of the members the same as that produced by the reset energizing current pulse for the first polarity information bits whereby the condition of saturation of all of the magnetic members which are in the stable condition of saturation for the other polarity bits are reversed. As the condition of saturation of any of the members is reversed by the readout energizing current pulse, an output energizing current pulse appears in an individual output circuit coupled thereto.

All of the individual output circuits of the magnetic members are individually coupled to the separate magnetic member so that the output energizing current pulses may be applied thereto in a polarity sense opposite that produced by the direct current bias energizing current. As the output energizing current pulses are applied to the separate magnetic member in this opposite polarity relationship, the condition of saturation of the separate magnetic member is thereby reversed, producing a single output pulse as the character which has been selected for this device to decode is received.

For a better understanding of the present invention, together with further objects, advantages and features thereof, reference is made to the following description and accompanying drawing in which the single figure illustrates the preferred embodiment of the present invention.

To facilitate the description, and in no way intending or inferring that this invention be limited thereto, a specific example of an application of this invention is in the teletypewriter switching art. In these applications, the incoming message is generally monitored and a single output pulse is produced for each character in the message or for certain selected characters which may be received in the message. Therefore, the operation of the device of this invention will be on the basis of decoding a single selected character which may be received in a message.

In the teletypewriter binary code, each character is represented by five information bits of two different polarities which are generally termed "mark" bits and "space" bits, respectively, and which are transmitted sequentially. A magnetic member or core corresponding to each information bit, in this instance five, is provided in the magnetic member matrix. These magnetic members are illustrated in the drawing by reference numerals 10, 20, 30, 40 and 50. A separate magnetic core or member, illustrated in the drawing by reference numeral 60, is also provided, the purpose of which will be explained in detail later. While five magnetic members are employed in the matrix in this application, it is to be understood that more or less magnetic core members may be required in the matrix in other applications which may employ a binary code or more or less information bits per character.

Each of the magnetic core members and the separate magnetic core member is composed of a magnetic material having substantially square hysteresis loop characteristics and each has two stable conditions of magnetic saturation generally termed the "P" condition and the "N" condition. These bistable magnetic members or cores may be of any desired shape. However, a toroidal form is preferred. For reasons of drawing clarity and simplification, all of these magnetic members have been illustrated as elongated rectangles.

A number of coils, such, for example, as that indicated by the numeral 6, each consisting of one or more coupling windings connected in series, are illustrated in the drawing. The coupling winding turns upon the several magnetic members are represented by lines making an acute angle with the member, the sense of the winding being represented by the direction of the acute angle. An acute angle to the left indicates an "N" sense winding, while an acute angle to the right indicates a "P" sense winding. It is to be understood that the direction of the acute angle of the coupling winding representative lines represent only the sense of the winding in relation to the polarity of the energizing current pulse which may flow therethrough and has no relation to the actual physical direction of this coupling winding. The aforementioned coils are illustrated in the drawing by straight vertical lines interconnecting one or more of the coupling winding representative lines. The function of each of the several coils herein represented and their associated coupling winding will be explained in detail later. In some application, these coils may consist of only a single conductor which is threaded through the various magnetic members thereby being coupled thereto by a single turn coupling winding which passes through the core once.

To establish the initial condition of operation of the device of this invention, a reset pulse source, the details of which form no part of this invention and are well known in the art, is illustrated in block form at reference numeral 1. One terminal 2 of reset pulse source 1 may be connected to point-of-reference potential 3 through lead 4. The other terminal 5 of reset pulse source 1 is coupled to each of the magnetic members 10, 20, 30, 40 and 50 through coil 6 and its associated series coupling windings 11, 21, 31, 41 and 51. The other end of coil 6 may be connected to point-of-reference potential 3 through lead 7, as indicated. Through this coupling circuit, consisting of coil 6 and its associated series coupling windings 11, 21, 31, 41 and 51, the reset energizing current pulse which emanates from reset pulse source 1 may be applied to each of the members concurrently. A source of direct current bias energizing current 59 is applied to separate member 60 through a bias coupling circuit which comprises coil 72, coupling winding 73 and potentiometer 74. The sense of coupling winding 73 may be such as to produce either stable condition of magnetic saturation in separate magnetic member 60; however, for purposes of illustration, coupling winding 73 has been herein shown as a straight line making an acute angle to the left, indicating an "N" sense winding.

The sense of coupling windings 11, 21, 31, 41 and 51 of the magnetic members 10, 20, 30, 40 and 50 is determined by the binary code of the character which has been selected to be decoded by the device of this invention. For purposes of illustration only, assume that the character "Z" is selected to be decoded. The first and fifth information bits of the teletypewriter binary code for the character "Z" are first polarity or "mark" bits while the second, third and fourth information bits are of the other polarity or "space" bits. The reset energizing current pulse is concurrently applied to each of the magnetic members, 10, 20, 30, 40 and 50, in a polarity sense for producing either stable condition of magnetic saturation in those of the magnetic members which correspond to the first polarity or "mark" information bits and the opposite condition of magnetic saturation in those of the magnetic members which correspond to the other polarity or "space" information bits of the teletypewriter binary code which represents the character "Z." Therefore, the reset energizing current pulse is applied to those members, 10 and 50, which correspond to the "mark" information bits through coupling windings 11 and 51, shown as lines forming acute angles to the left thereby denoting "N" sense windings, and to the other of those members, 20, 30 and 40, which correspond to the "space" information bits through coupling windings 21, 31 and 41, shown as straight lines forming acute angles to the right thereby denoting "P" sense windings.

A monitoring device, the details of which form no part of this invention, is indicated in block form at reference numeral 8. Any suitable monitoring device, such as a tape reader, may be employed in this application, the only requirement being that the monitoring device have an individual output circuit, 12, 22, 32, 42 and 52, for each information bit. Assume for purposes of illustration that the device indicated by reference numeral 8 is a tape reader and that the "mark" information bits are represented in the tape as holes and that the "space" information bits be represented in the tape as the absence of holes. As the tape is passed between the individual contacts, 13, 23, 33, 43 and 53, of tape reader 8, the occurrence of any hole in the tape will, therefore, produce a signal energizing current in that individual output circuit from source of direct current potential 9. From this, it may be seen that a signal energizing current may appear in each of the individual output circuits for information bits of a first polarity or "marks." The individual output circuits 12, 22, 32, 42 and 52 of tape reader 8 are intercoupled with corresponding ones of the magnetic members 10, 20, 30, 40 and 50 through individual coupling coils 14, 24, 34, 44 and 54 and their associated coupling windings 15, 25, 35, 45 and 55. Through these individual circuits, the individual signal energizing currents are applied to the corresponding ones of the magnetic members in a polarity sense opposite that of the reset energizing current pulse which is applied to the same member. Therefore, coupling windings 15 and 55 of members 10 and 50 are shown as straight lines forming acute angles to the right indicating "P" sense windings, while coupling windings 25, 35 and 45 of members 20, 30 and 40 are shown as straight lines making acute angles to the left indicating "N" sense windings.

As the character "Z," which appears on the tape as a hole for the first and fifth information bits, is passed through the contacts of tape reader 8, a signal energizing current is applied to members 10 and 50 through contacts 13 and 53, output circuits 12 and 52, individual coils 14 and 54, and coupling windings 15 and 55 in a polarity sense for producing the "P" condition of saturation in members 10 and 50 which is opposite that produced by the reset energizing current pulse applied to the same members through coupling windings 11 and 51. Upon the occurrence of the character "Z," therefore, all of the magnetic members are in the "P" condition of saturation which is produced in members 10 and 50 by the signal energizing currents and in members 20, 30 and 40 by the reset energizing current pulse.

The ends of individual coils 14, 24, 34, 44 and 54 opposite the contacts of tape reader 8 are indicated in the drawing as going to the next decoder matrix. This connection is indicated for the purpose of illustrating that more than one character may be decoded through the use of a matrix of five magnetic members and a separate magnetic member for each of the other characters which is to be decoded. These ends, of course, must ultimately be returned to point-of-reference potential 3, a connection which is not shown in the drawing, for the purpose of completing the signal energizing current path from source 9.

To simultaneously interrogate each of the magnetic members at the conclusion of each character on the tape passing through tape reader 8, a readout pulse source, the details of which form no part of this invention, is indicated in block form at 19. One terminal 29 of readout source 19 is connected to point-of-reference potential 3 through lead 4 while the other terminal 39 is coupled to each of the magnetic members 10, 20, 30, 40 and 50 through coil 49 and its associated coupling windings 16, 26, 36, 46 and 56, all of which are shown as straight lines forming acute angles to the left which indicates "N" sense windings. The readout energizing current pulse emanating from source 9 is applied simultaneously to all of the members through this coupling circuit in a polarity sense for producing the same stable condition of saturation in all of the members as that produced by the reset energizing current pulse in those magnetic members 10 and 20, which correspond to the first polarity or "mark" information bits, thereby reversing the condition of saturation of all of the members which are in the opposite stable condition of saturation.

Because of the relative polarity sense relationship between the several coupling windings hereinbefore described, a reversal of the condition of saturation of all five of the members, upon the occurrence of the readout energizing current pulse, will occur only upon the receipt of the character "Z" in that only then will all five of the members be in that stable condition of saturation which is opposite that produced by the polarity sense of the applied readout energizing current pulses. In all other instances, at least one of the magnetic members will be in the stable condition of saturation which is the same as that produced by the polarity sense of the applied readout current pulse. For instance, should a first polarity or "mark" information bit appear as a hole in the tape which is passing through contacts 23, 33 or 43 of tape reader 8, a signal energizing current would thereby be applied to the corresponding magnetic members 20, 30 or 40 through its coupling winding 25, 35 or 45. As coupling windings 25, 35 and 45 are all shown as straight lines forming acute angles to the left, indicating "N" sense windings, a signal energizing current applied to any or all of these coupling windings would produce the stable condition of saturation in that member which is the same as that produced by the polarity sense of the applied readout energizing current pulse, therefore, no reversal of condition of saturation would occur in that member with the applied readout energizing current pulse.

Coupled to each of the members is an individual output circuit indicated as coils 17, 27, 37, 47 and 57 and their associated coupling windings 18, 28, 38, 48 and 58. The polarity sense of these output coupling windings in relation to the several other coupling windings of the magnetic members is not important but, for convenience, are shown as straight lines forming acute angles to the left. As the condition of saturation of any or all of the members is reversed by the readout energizing current pulse, an output energizing current pulse will appear in the individual output circuit of that member. In the presence of the character "Z," therefore, an output energizing current pulse will appear in each of the individual output circuits or a total of five. In the presence of any other character, as has been explained before, there will be a total of less than five output energizing current pulses produced.

Intercoupling each of the individual output circuits and the separate magnetic member 60 are coupling coils 62, 63, 64, 65 and 66 and their associated coupling windings 67, 68, 69, 70 and 71. Each of these coupling windings is shown as a straight line forming an acute angle to the right indicating "P" sense windings, for applying the output energizing current pulses to the separate magnetic member 60 in a polarity sense opposite that of the source of direct current bias potential 59.

The purpose of the direct current bias energizing current is to not only produce either stable condition of saturation in separate member 60 but also to maintain separate magnetic member 60 in this stable condition of saturation except for the presence of an output energizing current pulse in all of the opposite sense coupling windings 67, 68, 69, 70 and 71. The magnitude of the direct current bias energizing current may be adjusted by potentiometer 74 to a value sufficient to maintain the stable condition of saturation produced thereby in the absence of an output signal energizing current pulse in any of the coupling windings 67, 68, 69, 70 and 71. Therefore, upon the occurrence of the character "Z," the readout energizing current pulse will reverse the condition of saturation of all of the magnetic members, in a manner as previously described, thereby producing an output current pulse in all of the individual output circuits associated therewith, resulting in a signal energizing pulse in all of the coupling windings 67, 68, 69, 70 and 71 of separate magnetic member 60. The presence of a signal energizing current pulse in all of these coupling windings is sufficient to overcome the direct current bias potential and reverse the condition of magnetic saturation of member 60. Since, as has been explained before, the presence of any character except the character "Z" will produce less than five output energizing current pulses in the individual output circuits of the magnetic members, the condition of saturation of separate magnetic member 60 will be reversed only when the character "Z" is detected in readout device 8.

An output circuit consisting of coil 76 and its associated coupling winding 75 is coupled to separate magnetic member 60. While the sense of coupling winding 75 is unimportant, for convenience, it has been indicated by a straight line forming an acute angle to the left. Upon the reversal of the condition of saturation of separate magnetic member 60, in response to the presence of an output energizing current pulse in all of the coupling windings 67, 68, 69, 70 and 71, a single output pulse will appear across output terminals 77 and 78. Since the reversal of the condition of saturation of separate magnetic member 60 can occur only when the character "Z" is detected by tape reader 8, the decoder device of this invention will produce a single output pulse for the character "Z" only.

While a preferred embodiment of this invention has been shown and described, it will be obvious to those skilled in the art that various modifications and substitutions may be made without departing from the spirit of the invention which is to be limited only within the scope of the appended claims.

What is claimed is:

1. A binary information decorder responsive to a preselected one of a given plurality of binary codes, each of said codes being composed of a unique combination of mark and space information bits, said decoder comprising an array of bistable elements each of which corresponds to a particular information bit and each of which has first and second stable conditions, a reset pulse source, means coupling said reset pulse source to each of said bistable elements for presetting the stable condition of each of said bistable elements in response to a reset pulse to manifest the binary complement of said preselected one of said binary codes, means coupled to each of said bistable elements for applying each of the respective bits of any of said plurality of binary codes to its corresponding bistable element following the presetting thereof to switch the preset stable condition of only those bistable elements having a mark information bit applied thereto to the other stable condition thereof, whereby only in response to the application of said preselected one of said binary codes will all said bistable elements have the same given stable condition, a readout pulse source coupled to each of said bistable elements for switching those bistable elements having said given stable condition to a stable condition opposite to said given stable condition in response to a readout pulse, individual output means individually coupled to each bistable element for producing an output pulse therefrom in response to the bistable element to which it is individually coupled switching from said given stable condition to a stable condition opposite to said given stable condition, and coincidence means coupled to all said output means for producing a final output only in response to the simultaneous production of output pulses by all said output means.

2. The binary information decoder defined in claim 1, wherein each of said bistable elements is a magnetic core having a substantially square hysteresis loop.

3. The binary information decoder defined in claim 1, wherein said coincidence means comprises a magnetic core having a square hysteresis loop, means coupling all said output means to said magnetic core for tending to switch said magnetic core from a first to a second state of magnetization thereof in response to each output pulse, direct current bias means coupled to said magnetic core for applying a magnetic field of a magnitude sufficient to maintain said magnetic core in said first state of magnetization thereof except when output pulses from all said output means occur simultaneously, and final means coupled to said magnetic core for producing said final output in response to said magnetic core being switched from one state of magnetization thereof to another.

References Cited in the file of this patent

UNITED STATES PATENTS

| | | |
|---|---|---|
| 2,682,573 | Hunt | June 29, 1954 |
| 2,719,962 | Karnaugh | Oct. 4, 1955 |
| 2,736,880 | Forrester | Feb. 28, 1956 |
| 2,782,399 | Rajchman | Feb. 19, 1957 |
| 2,844,812 | Auerbach | July 22, 1958 |
| 2,846,671 | Yetter | Aug. 5, 1958 |
| 2,856,596 | Miller | Oct. 14, 1958 |
| 2,862,197 | Ringelman | Nov. 25, 1958 |
| 2,907,894 | Bonn | Oct. 6, 1959 |
| 2,912,679 | Bonorden | Nov. 10, 1959 |
| 2,919,354 | Russell | Dec. 29, 1959 |